US006646871B1

(12) United States Patent
Liao et al.

(10) Patent No.: US 6,646,871 B1
(45) Date of Patent: Nov. 11, 2003

(54) MOUNTING APPARATUS FOR MOUNTING A DATA STORAGE DEVICE IN A COMPUTER ENCLOSURE

(75) Inventors: Nien-Chiang Liao, Tu-chen (TW); Kuang-Wei Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/210,907

(22) Filed: Aug. 2, 2002

(51) Int. Cl.[7] ................................................. G06F 1/16
(52) U.S. Cl. ..................... 361/685; 361/686; 312/223.2; 312/332; 312/333
(58) Field of Search ................................. 361/685, 686; 312/223.1, 223.2, 331.1, 331.2, 332, 333

(56) References Cited

U.S. PATENT DOCUMENTS 6,236,563 B1 * 5/2001 Buican et al. .............. 361/685
6,256,195 B1 * 7/2001 Liao .......................... 361/685
6,469,890 B1 * 10/2002 Gan ........................... 361/685

* cited by examiner

Primary Examiner—Boris Chervinsky
Assistant Examiner—Anthony Q. Edwards
(74) Attorney, Agent, or Firm—We Te Chung (57) ABSTRACT

A mounting apparatus includes a first bracket (20), a second bracket (30), and a securing device (60). The securing device includes a securing member (40) and a coil spring (50). The first bracket includes a pair of first catches (22), a second catch (25), and first and second support tabs (23, 24). The second bracket is removably attached to the first bracket, and includes a pair of latches (342) and a pair of first locking openings (341). The securing member is movably attached to the first bracket, and includes first and second posts (431, 441), a pair of locking slots (421), and a second locking opening (411). The first and second posts are movably received in the first and second support tabs. The second locking opening engagingly receives the second catch. The first locking openings receive the first catches. The latches snappingly engage in the locking slots.

19 Claims, 7 Drawing Sheets

MOUNTING APPARATUS FOR MOUNTING A DATA STORAGE DEVICE IN A COMPUTER ENCLOSURE

BACKGROUND OF THE INVENTION

1. Field of the Invention

The present invention relates to mounting apparatuses for computer enclosures, and particularly to a mounting apparatus for conveniently mounting a data storage device in a computer enclosure.

2. Description of The Related Art

Data storage devices widely used in personal computers include compact disc read-only memory (CD-ROM) devices, hard disk drives (HDDs), and floppy disk drives (FDDs). Conventionally, a data storage device is attached to a drive bracket simply with screws. In assembly, an operator must align the data storage device with the drive bracket with one hand, and fasten the screws with the other hand. This is inconvenient and laborious.

U.S. Pat. Nos. 5,332,306 and 5,262,923 disclose a rail type mounting device with two rails attached to opposite sides of a data storage device. The data storage device can then be slidably mounted in a drive bracket of a computer. However, the rails are attached to the data storage device by conventional screws. This is inconvenient and laborious, and does not satisfactorily resolve the above-mentioned problem.

U.S. Pat. No. 5,599,080 discloses a mounting device for a data storage device without screws. The data storage device is secured by pushing pins integral with each of two rails into corresponding side holes defined in the data storage device. However, the pins are thin and flexible, and are easily bent during operations such as removing of the data storage from a drive bracket of a computer. Once the pins become bent, subsequent alignment and securing of the data storage device to the drive bracket is quite difficult. Furthermore, the data storage device cannot be firmly secured, due to gaps that exist between the pins and the drive bracket at the side holes. The data storage device is liable to sustain vibration and shock during operation and use of the computer.

Therefore, there is a need for an improved apparatus which overcomes the above-mentioned problems.

SUMMARY OF THE INVENTION

Accordingly, an object of the present invention is to provide a mounting apparatus for readily and conveniently mounting a data storage device in a computer enclosure.

In order to achieve the above object, a mounting apparatus in accordance with the present invention comprises a first bracket, a second bracket and a securing device. The securing device comprises a securing member and a coil spring. The first bracket comprises a pair of first catches, a second catch, a first support tab, and a second support tab. The second bracket comprises a pair of latches, and defines a pair of first locking openings. The securing member comprises a first support plate and a second support plate, and defines a pair of locking slots and a second locking opening. First and second posts respectively extend from the first and second support plates. The first and second posts are movably received in the first and second support tabs of the first bracket. The second locking opening engagingly receives the second catch. Thus the securing member is movably secured to the first bracket. When the second bracket is removably attached to the first bracket, the first locking openings of the second bracket receive the first catches of the first bracket. The latches of the second bracket snappingly engage in the locking slots of the securing member.

Other objects, advantages and novel features of the present invention will become more apparent from the following detailed description when taken in conjunction with the accompanying drawings, in which:

DETAILED DESCRIPTION OF THE PREFERRED EMBODIMENTS

Figure 1:
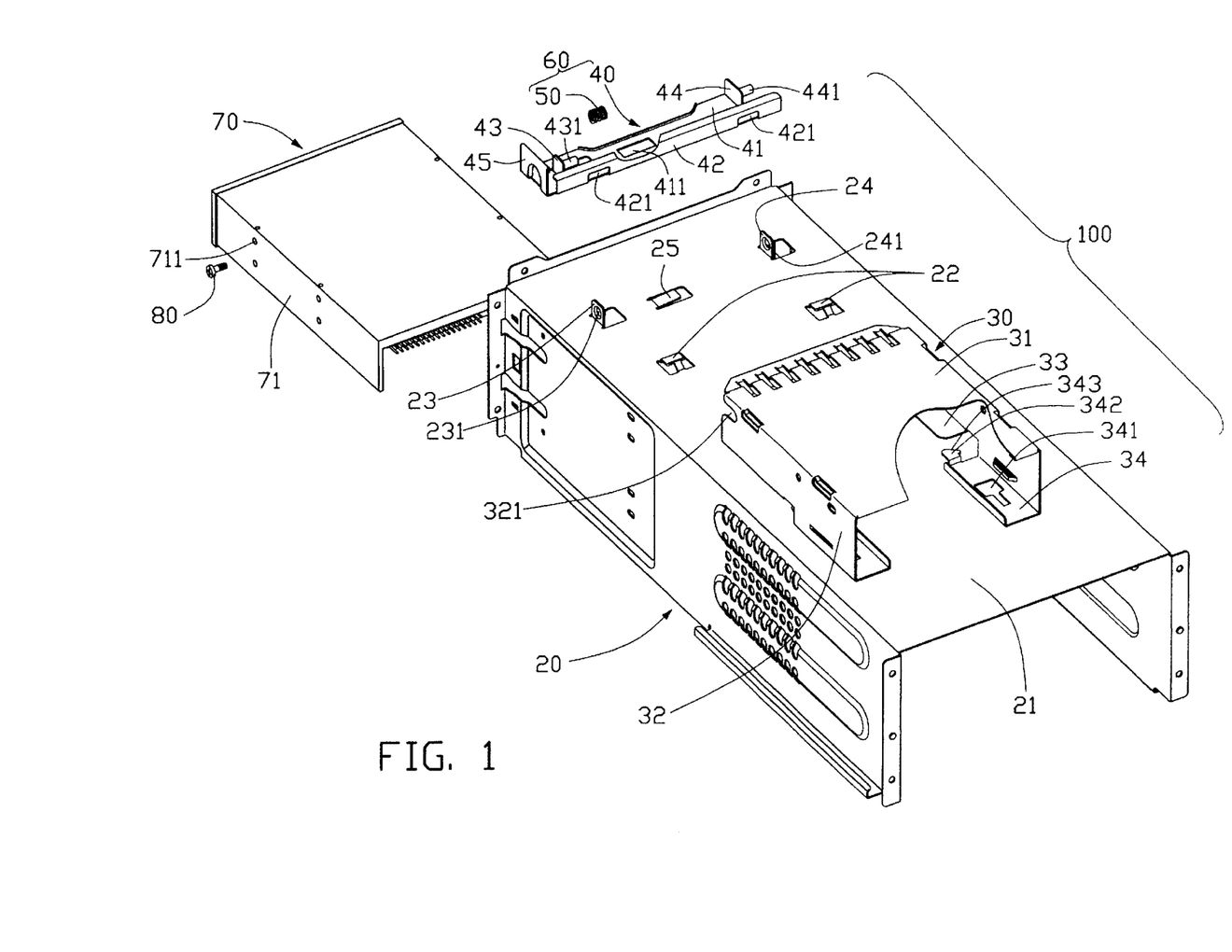
FIG. 1 is an exploded isometric view of a mounting apparatus in accordance with a preferred embodiment of the present invention together with a data storage device, and with parts of the mounting apparatus cut away for clarity.

Referring to FIG. 1, a mounting apparatus 100 in accordance with a preferred embodiment of the present invention comprises a first bracket 20, a second bracket 30 and a securing device 60. The mounting apparatus 100 is for mounting a data storage device in a computer enclosure 10 (see FIG. 4).

The first bracket 20 comprises a horizontal main wall 21. A pair of spaced first catches 22 is upwardly formed from the main wall 21. A first support tab 23 and a second support tab 24 extend upwardly from a front portion of the main wall 21. The first and second support tabs 23, 24 are spaced from each other. Through holes 231, 241 are respectively defined in the first and second support tabs 23, 24. A resilient second catch 25 is formed in the main wall 21 between the first and second support tabs 23, 24.

The second bracket 30 comprises a top wall 31, and two generally L-shaped side walls 32 depending from opposite sides of the top wall 31 respectively. Two U-shaped cutouts 321 are respectively defined in front edges of the side walls 32. A pair of intermediate flanges 33 extends perpendicularly inwardly from forward bottom edges of the side walls 32 respectively. A pair of bottom flanges 34 extends perpendicularly inwardly from rearward bottom edges of the side walls 32 respectively. The bottom flanges 34 are for supporting the second bracket 30 on the main wall 21 of the first bracket 20. A generally T-shaped first locking opening 341 is defined in a middle portion of each bottom flange 34. The first locking openings 341 corresponding to the first catches 22 of the first bracket 20. A latch 342 is upwardly and forwardly formed at a front end of each bottom flange 34. Each latch 342 comprises a front bevel edge 343.

The securing device 60 comprises a securing member 40 and a coil spring 50. The securing member 40 comprises a bottom wall 41, and a lateral wall 42 extending perpendicularly upwardly from a lateral edge of the bottom wall 41. A first support plate 43 and a second support plate 44 extend upwardly from opposite ends of the bottom wall 41 respectively, corresponding to the first and second support tabs 23, 24 of the first bracket 20. A first post 431 and a second post 441 extend horizontally in a same direction from the first and second support plates 43, 44 respectively. A second locking opening 411 is defined in the bottom wall 41 between the first and second support plates 43, 44, corresponding to the second catch 25 of the first bracket 20. An operating portion 45 extends perpendicularly upwardly from an endmost portion of the bottom wall 41 near the first support plate 43. A pair of spaced locking slots 421 is defined in the lateral wall 42 adjacent the bottom wall 41, corresponding to the latches 342 of the bottom flanges 34 of the second bracket 30.

A data storage device 70 comprises two opposite lateral walls 71. A locking hole 711 is defined in a forward portion of each lateral wall 71. A pair of screws 80 (only one shown) is for insertion into the locking holes 711.

Figure 2:
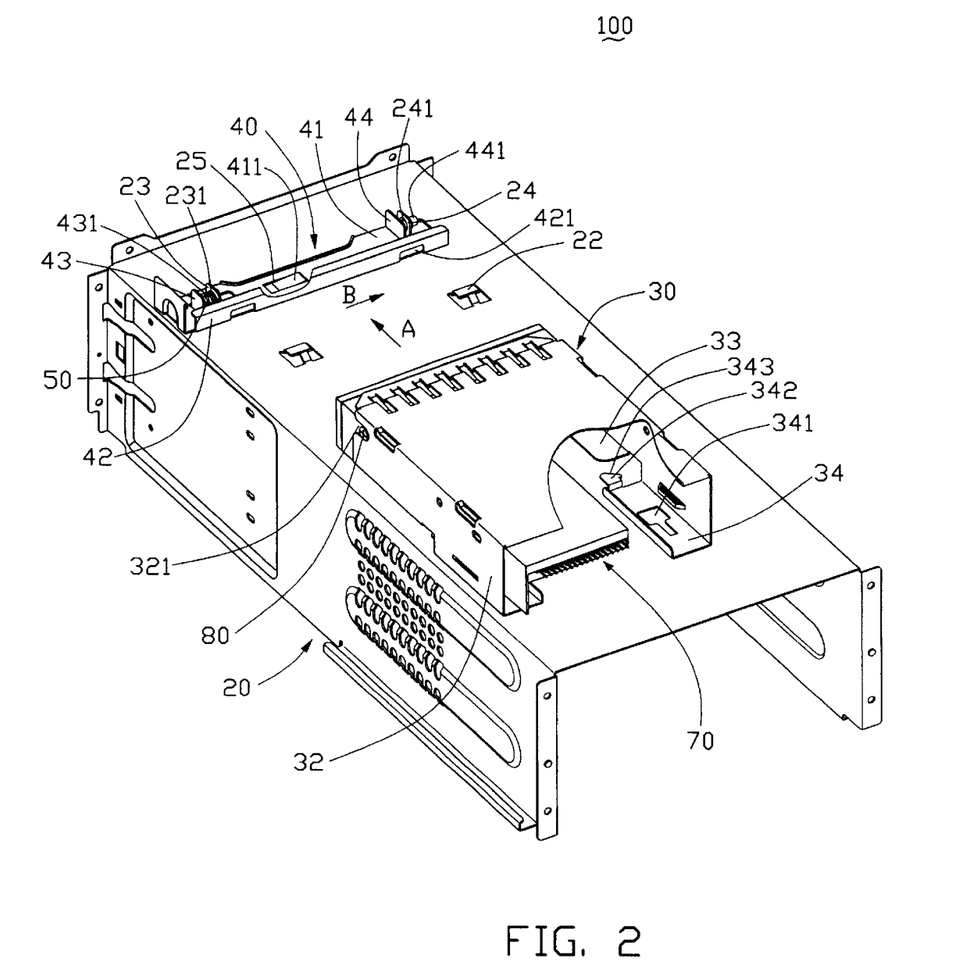
FIG. 2 is a partly assembled view of FIG. 1.
Figure 3:
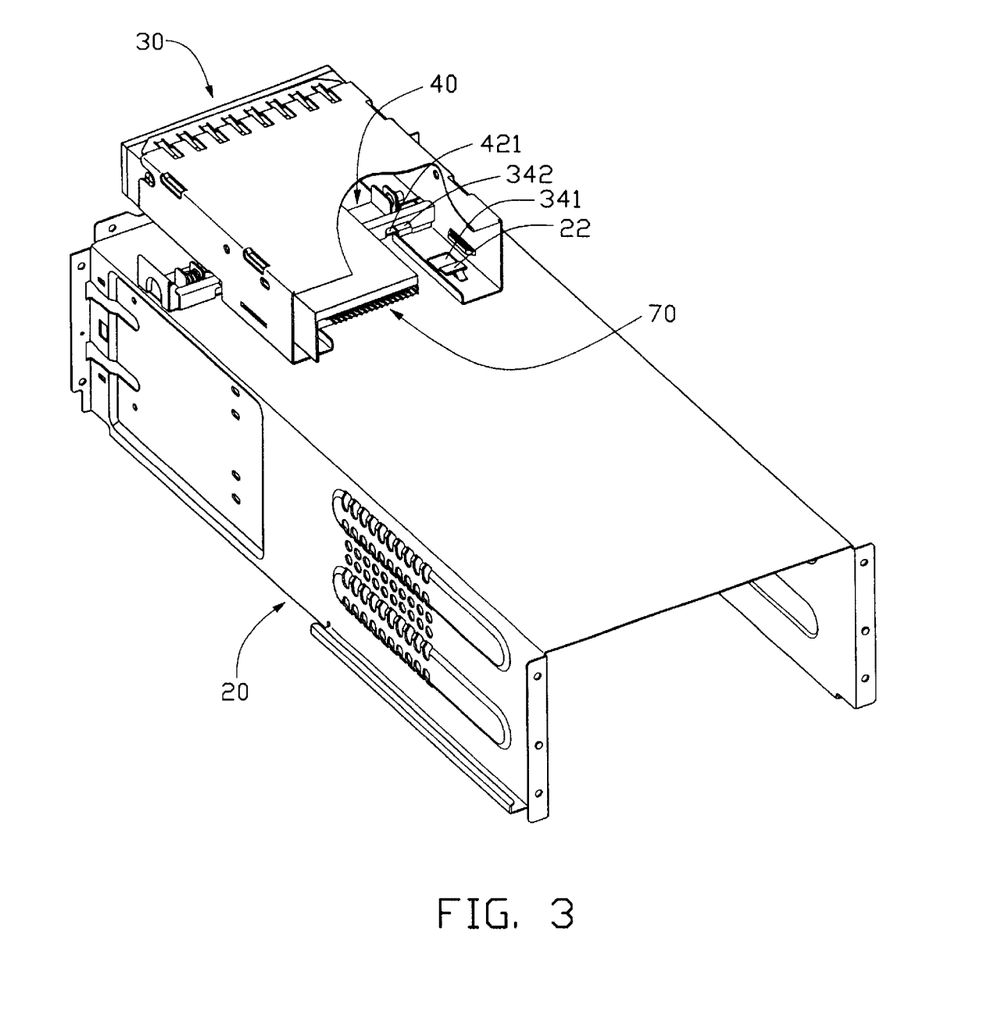
FIG. 3 is a fully assembled view of FIG. 1.

Referring to FIGS. 2 and 3, in assembly, the coil spring 50 is placed around the first post 431 of the first support plate 43 of the securing member 40. The first and second posts 431, 441 of the first and second support plates 43, 44 of the securing member 40 are passed through the corresponding through holes 231, 241 of the first and second support tabs 23, 24 of the first bracket 20. The coil spring 50 is disposed between the first support plate 43 and the first support tab 23. The second catch 25 of the first bracket 20 snappingly engages in the locking opening 411 of the bottom wall 41 of the securing member 40. Thus the securing device 60 is secured to the first bracket 20. The screws 80 are threadedly engaged in the locking holes 711 of the lateral walls 71 of the data storage device 70. The data storage device 70 is inserted into the second bracket 30 until the screws 80 are received in inmost ends of the cutouts 321 of the side walls 32. A bottom face (not shown) of the data storage device 70 is supported on the intermediate flanges 33 of the second bracket 30. The combined second bracket 30 and data storage device 70 is then moved in direction A until the bevel edges 343 of the latches 342 of the bottom flanges 34 contact edges of the lateral wall 42 of the securing member 40 at the locking slots 421. The bevel edges 343 slide along said edges of the lateral wall 42, and the securing member 40 moves in direction B. Simultaneously; the coil spring 50 is compressed. Also simultaneously, the first catches 22 of the first bracket 20 are received in the first locking openings 341 of the bottom flanges 34 of the second bracket 30. The securing member 40 continues moving until the bevel edges 343 are completely received in the locking slots 421. At this point, the coil spring 50 expands back toward its original shape, causing the securing member 40 to move back in a direction opposite to direction B. Thus the latches 342 are snappingly engaged in the locking slots 421. The combined data storage device 70 and second bracket 30 is securely attached to the first bracket 20 (see FIG. 3).

Figure 6:
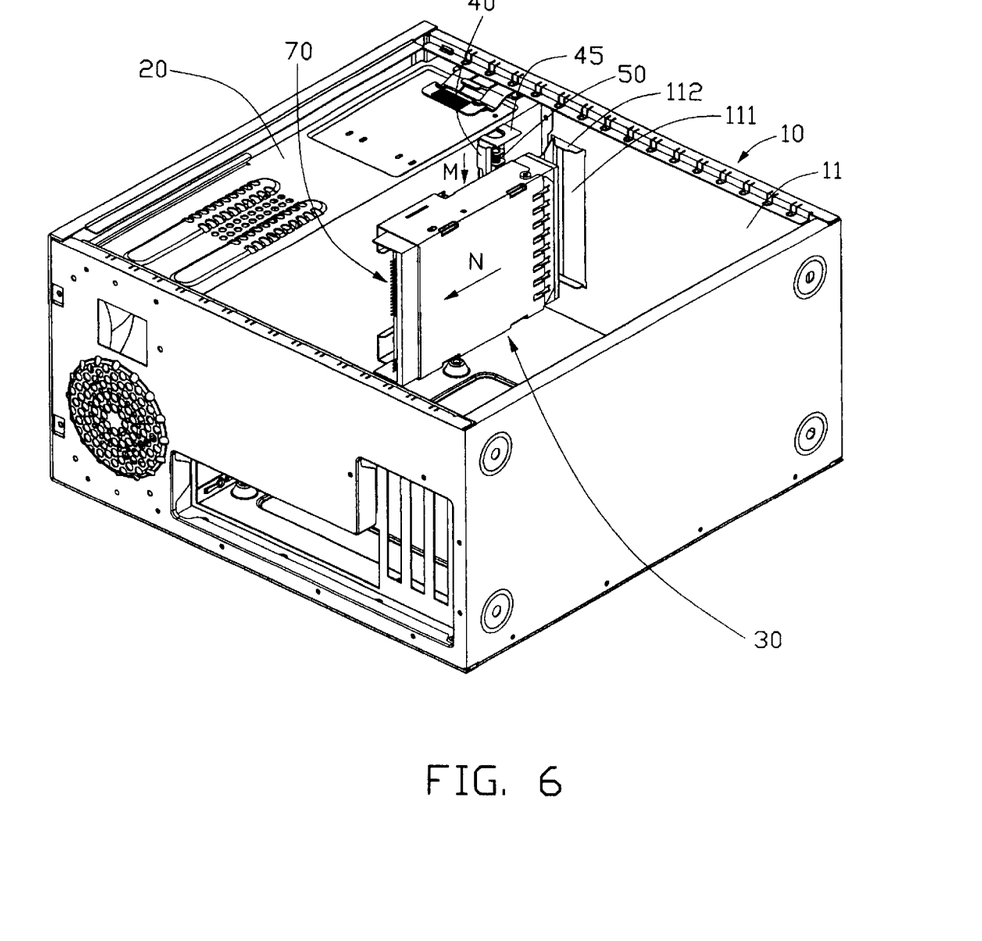
FIG. 6 is similar to FIG. 4, but showing the data storage device partly detached from the computer enclosure.

Referring to FIG. 6, the computer enclosure 10 comprises a front panel 11. An elongate opening 111 is defined in the front panel 11, for providing access to the data storage device 70 received in the enclosure 10. A pair of baffle plates 112 extends perpendicularly inwardly from the front panel 11 at opposite sides of the opening 111 respectively.

Figure 4:
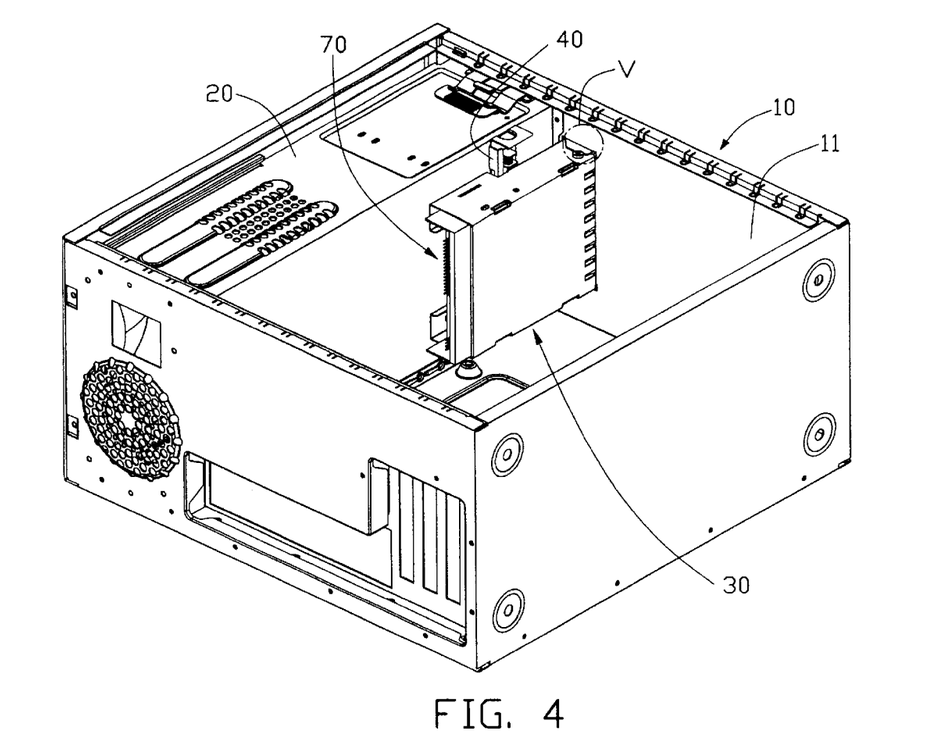
FIG. 4 is an isometric view of the mounting apparatus and data storage device of FIG. 1 assembled together and mounted in a computer enclosure.
Figure 5:
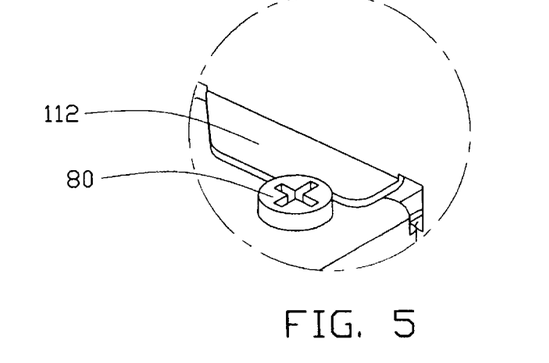
FIG. 5 is an enlarged view of a circled portion V of FIG. 4.

FIG. 4 shows the data storage device 70 being attached to the enclosure 10. The combined first bracket 20, second bracket 30 and data storage device 70 is secured in the enclosure 10. Referring also to FIG. 5, the baffle plates 112 of the front panel 11 of the enclosure 10 abut the screws 80. The baffle plates 112 thus prevent the data storage device 70 from protruding too far out from the opening 111 of the front panel 11.

FIG. 6 shows the data storage device 70 being detached from the enclosure 10. The operating portion 45 of the securing member 40 is pushed downwardly in direction M, and the coil spring 50 is compressed. Thus the latches 342 of the bottom flanges 34 of the second bracket 30 are released from the locking slots 421 of the lateral wall 42 of the securing member 40 (see FIG. 3). The combined second bracket 30 and data storage device 70 is pulled rearwardly in direction N. The first catches 22 of the first bracket 20 disengage from the first locking openings 341 of the bottom flanges 34 of second bracket 30 (see FIG. 3). Thus, the combined second bracket 30 and data storage device 70 is detached from the enclosure 10.

Figure 7:
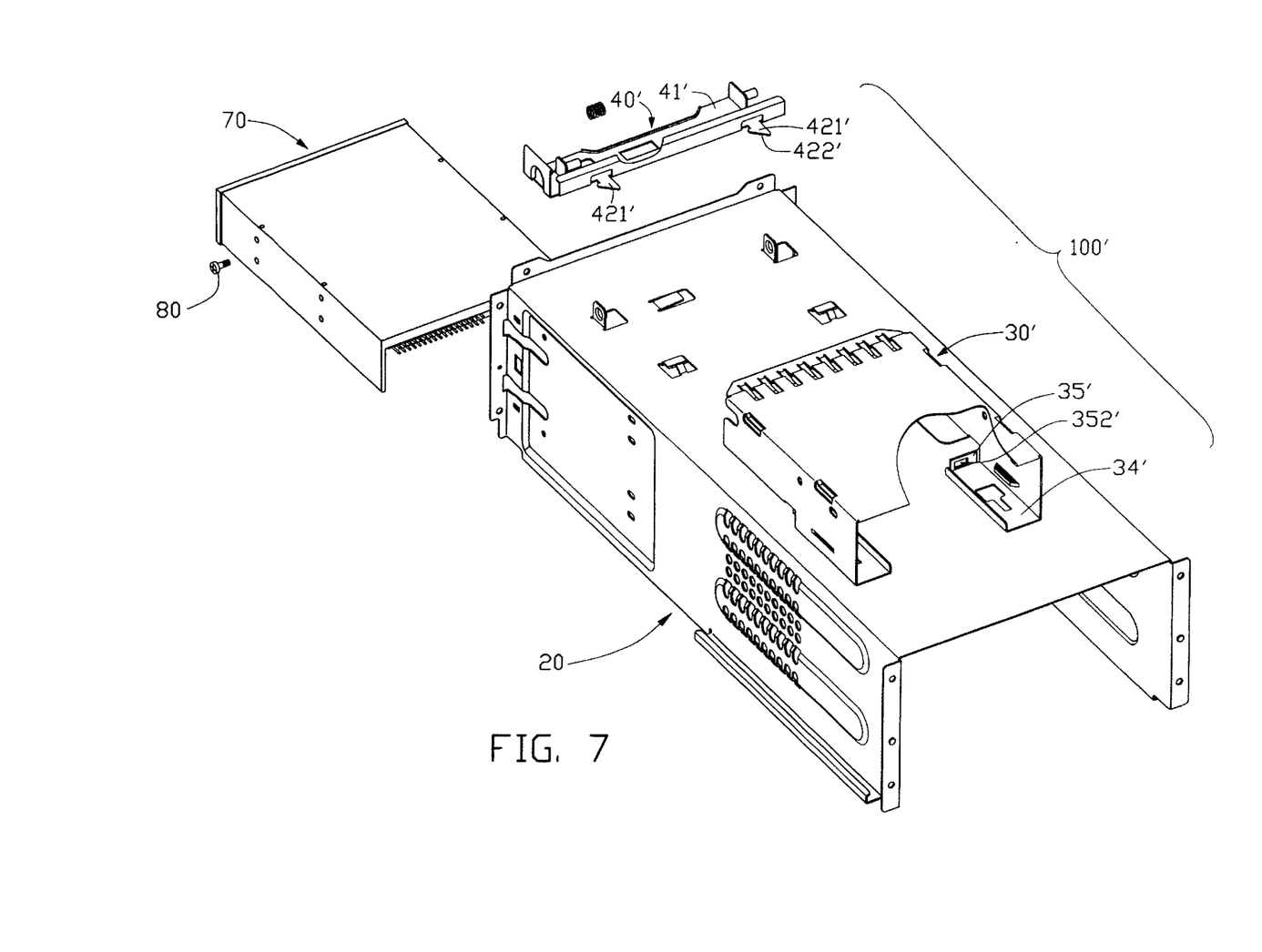
FIG. 7 is an exploded isometric view of a mounting apparatus in accordance with an alternative embodiment of the present invention together with the data storage device, and with parts of the mounting apparatus cut away for clarity.

FIG. 7 shows a mounting apparatus 100' in accordance with an alternative embodiment of the present invention. The mounting apparatus 100' is similar to the mounting apparatus 100 of the preferred embodiment, except for the following matters. A plate 35' extends perpendicularly upwardly from a front edge of each of two bottom flanges 34' of a second bracket 30'. A locking slot 352' is defined in each plate 35'. A pair of spaced latches 421' extends coplanarly rearwardly from a bottom wall 41' of a securing member 40'. Each latch 421' comprises a rear bevel edge 422'.

Figure 8:
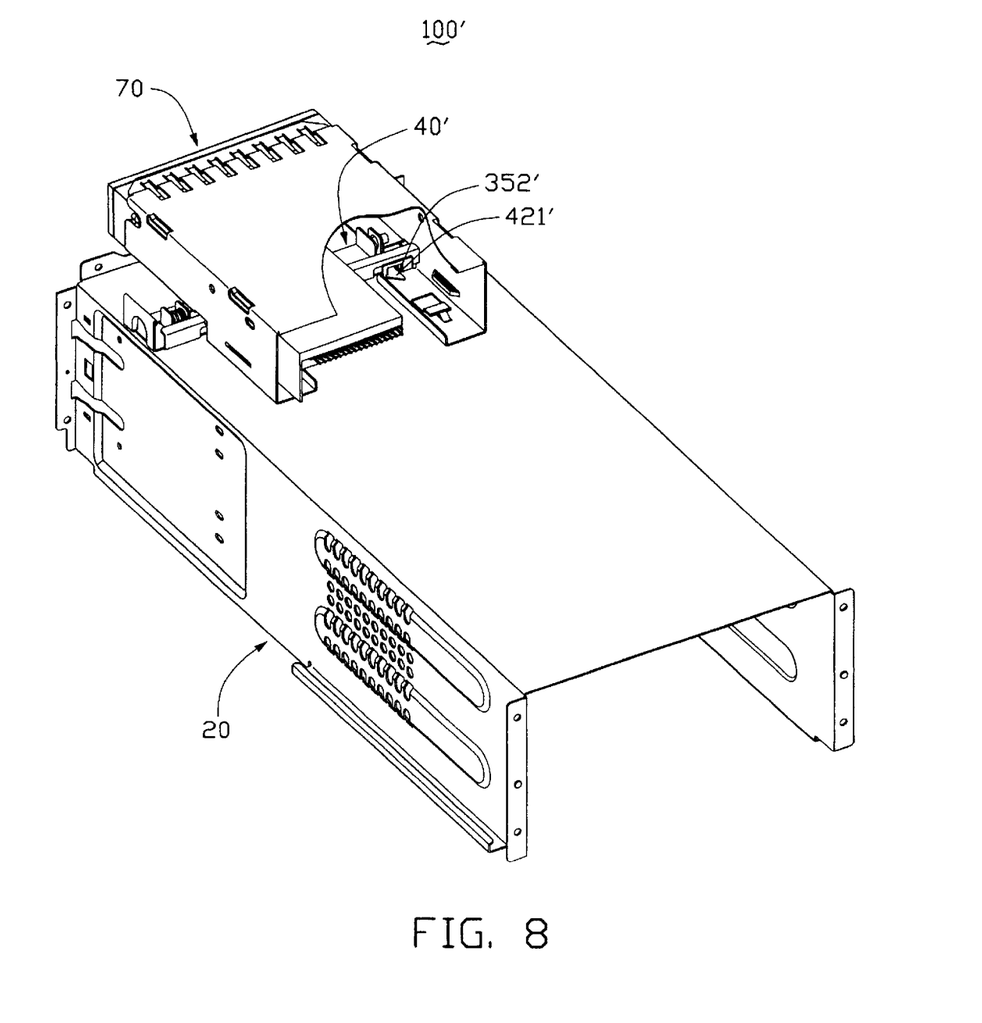
FIG. 8 is a fully assembled view of FIG. 7.

Referring to FIG. 8, assembly of the mounting apparatus 100' of the alternative embodiment is similar to assembly of the mounting apparatus 100 of the preferred embodiment. Reference is made to the above detailed description of assembly of the mounting apparatus 100 of the preferred embodiment, with due alteration of details.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A mounting apparatus for mounting a data storage device in a computer enclosure, the mounting apparatus comprising:
   a first bracket adapted to be secured to the computer enclosure, the first bracket comprising a main wall;
   a second bracket removably attached to the main wall of the first bracket, the second bracket comprising a top wall and two side walls;
   a securing device movably secured to the main wall of the first bracket, the securing device comprising a securing member and an elastic member; and
   complementary latching means disposed at the second bracket and at the securing member, the latching means comprising a latch and a complementary locking slot,
   wherein when the elastic member is compressed between the securing member and the first bracket, the latch snappingly engages in the locking slot; and when the securing device is pushed in a first direction, the latch is released from the locking slot and the second bracket can be pulled away from the securing device in a second direction perpendicular to the first direction.

2. The mounting apparatus as described in claim 1, wherein a pair of spaced first catches is arranged on the main wall of the first bracket.

3. The mounting apparatus as described in claim 1, wherein a pair of spaced support tabs is arranged on a front portion of the main wall of the first bracket.

4. The mounting apparatus as described in claim 3, wherein each of the support tabs defines a through hole therein.

5. The mounting apparatus as described in claim 3, wherein a second catch is arranged on the main wall of the first bracket between the support tabs.

6. The mounting apparatus as described in claim 1, wherein a pair of intermediate flanges extends perpendicularly inwardly from forward bottom edges of the side walls of the second bracket, for supporting the data storage device thereon.

7. The mounting apparatus as described in claim 2, wherein a pair of bottom flanges extends perpendicularly inwardly from rearward bottom edges of the side walls of the second bracket, for supporting the second bracket on the main wall of the first bracket.

8. The mounting apparatus as described in claim 7, wherein the bottom flanges each define a first locking opening, and the first locking openings engagingly receive the first catches of the first bracket.

9. The mounting apparatus as described in claim 7, wherein a plate extends upwardly from a front edge of one of the bottom flanges.

10. The mounting apparatus as described in claim 5, wherein the securing member comprises a bottom wall, and a lateral wall generally perpendicular to the bottom wall.

11. The mounting apparatus as described in claim 10, wherein a pair of spaced support plates is arranged on the bottom wall of the securing member, a pair of posts extends from the support plates, and the posts are movably received in the through holes of the support tabs of the first bracket.

12. The mounting apparatus as described in claim 11, wherein a second locking opening is defined in the bottom wall of the securing member between the support plates, and the second locking opening engagingly receives the second catch of the first bracket.

13. The mounting apparatus as described in claim 1, wherein an operating portion extends upwardly from an end of the bottom wall of the securing member.

14. The mounting apparatus as described in claim 11, wherein the elastic member is disposed between one of the support plates of the securing member and a corresponding support tab of the first bracket.

15. The mounting apparatus as described in claim 7, wherein the latch of the latching means is arranged at an end of one of the bottom flanges of the second bracket, and the locking slot of the latching means is defined in the securing member.

16. The mounting apparatus as described in claim 9, wherein the latch of the latching means is arranged on the securing member, and the locking slot of the latching means is defined in the plate of the corresponding bottom flange of the second bracket.

17. A computer enclosure assembly comprising:

a stationary main wall;

a bracket linearly detachably mounted on and moveable relative to the main wall in a first direction;

means formed on both the main wall and the bracket to guide movement of the bracket relative to the main wall along said first direction;

a securing device detachably mounted on and moveable relative to the main wall in a second direction perpendicular to said first direction;

latching means formed on one of said securing device and the bracket to lock the bracket to the main wall when said securing device is in a first position while disengaged from the main wall when said securing device is in a second position.

18. The assembly as described in claim 17, wherein the securing device is constantly urged to be in the first position by an elastic member.

19. The assembly as described in claim 18, wherein one of said securing device and said main wall includes a hole and the other includes a post extending therethrough for guiding movement of the securing device along the second direction, under a condition that the elastic, member is in a pre-loaded manner.

* * * * *